Patented July 3, 1923.

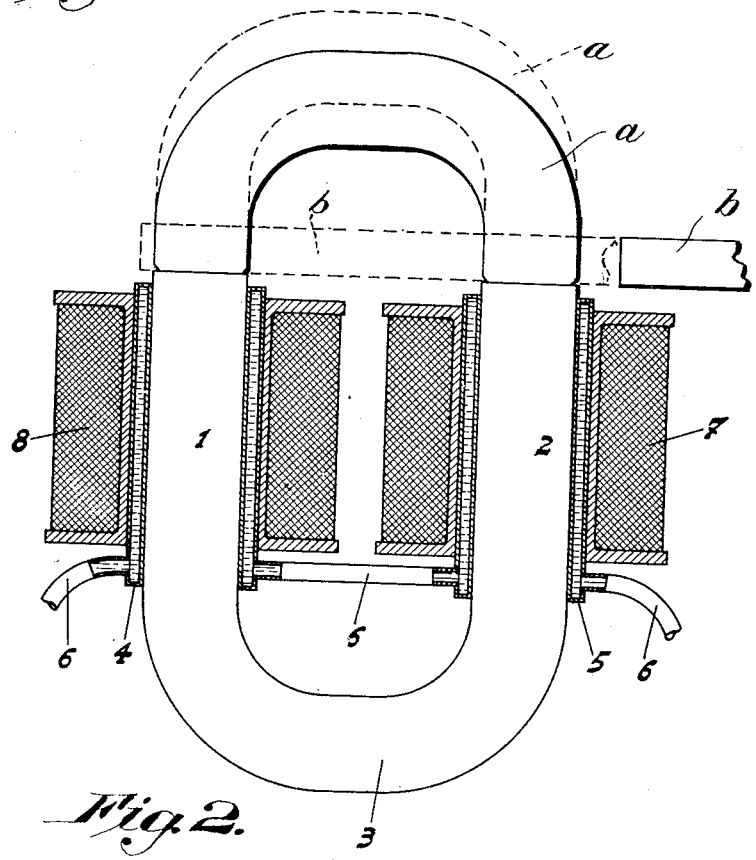
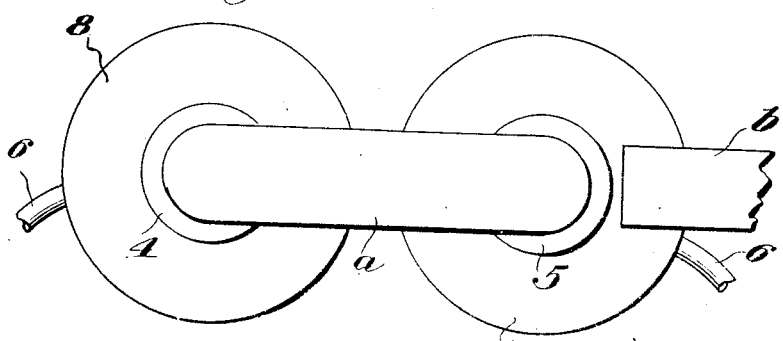

1,460,759

UNITED STATES PATENT OFFICE.

EMIL KUHN-FREI, OF ZURICH, SWITZERLAND, ASSIGNOR TO ARNOLD WEINMAN, OF ZURICH, SWITZERLAND.

PROCESS FOR MAGNETIZING BODIES.

Application filed November 20, 1919. Serial No. 339,309.

*To all whom it may concern:*

Be it known that I, EMIL KUHN-FREI, a citizen of the Swiss Confederation, residing at Weinbergstrasse No. 145, Zurich, Switzerland, have invented new and useful Improvements in Processes for Magnetizing Bodies, of which the following is a specification.

The present invention relates to a new and improved process for magnetizing bodies for instance for the production of permanent magnets used in manufacturing of igniting devices for internal combustion engines, for magneto-electric machines and so on.

One object of the invention is to provide a simple and effective process to magnetize the bodies in a far more effective manner and with less loss of time and labor than heretofore.

In the accompanying drawings:—

Fig. 1 is a view, partly in section and partly in elevation.

Fig. 2 is a plan view.

The novel process as applied for instance to magnetize a U-shaped yoke for an electro-magnetic machine is as follows:

To magnetize bodies use is made of an electro-magnet 3 as shown diagrammatically in the annexed drawing. On the shanks 1, 2 the windings 7, 8 are placed, said windings being connected to the poles of a current generator, a dynamo for instance. Between the shanks 1, 2 and the windings 7, 8 water jackets 4, 5 are placed which are interconnected and connected with a source of cooling water not shown in the drawing.

The U-shaped body or yoke to be magnetized and which is indicated at *a*, is placed with its free ends on the poles of the electro-magnet 3 and is left standing thereon face to face only for a short time, while current is flowing through the windings. The current is then slowly decreased, for instance by decreasing the number of revolutions of the dynamo and when the current is about to cease altogether the yoke is shifted on the poles of the electro-magnet 3 and moved to the edges of the shanks 1, 2. The yoke is then removed from the poles and as the yoke is leaving the electro-magnet an iron piece *b* is placed over the free ends of the yoke to form a bridge. The lines of force through the yoke are not broken by removing the yoke from the electro-magnet and after the removal the magnetic circuit is closed and no leakage or dispersion occurs. It has been found of advantage to keep the temperature of the electro-magnet 3 low and cooling water is freely circulated through the jackets during the magnetizing process.

Having now described the process what I claim and wish to secure by Letters Patent is:

The herein described process of magnetizing bodies by means of an electro-magnet, consisting in reducing the temperature of the electro-magnet, placing the body to be magnetized with its poles on the poles of the electro-magnet, energizing the latter with a strong electric current for a sufficient period, then progressively decreasing the strength of the current, removing the poles of the body from those of the electro-magnet while the strength of the current is being decreased and simultaneously bridging the poles of the said body.

In testimony whereof I affix my signature in presence of a witness.

EMIL KUHN-FREI.

Witness:
WM. DURIG.